US009197950B2

(12) United States Patent
Murakami et al.

(10) Patent No.: US 9,197,950 B2
(45) Date of Patent: Nov. 24, 2015

(54) OPTICAL BRANCHING/SYNTHESIZING DEVICE

(71) Applicant: Sumitomo Electric Industries, Ltd., Osaka-shi (JP)

(72) Inventors: Yasunori Murakami, Yokohama (JP); Tomoyuki Funada, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/369,111

(22) PCT Filed: Dec. 25, 2012

(86) PCT No.: PCT/JP2012/083517
§ 371 (c)(1),
(2) Date: Jun. 26, 2014

(87) PCT Pub. No.: WO2013/103110
PCT Pub. Date: Jul. 11, 2013

(65) Prior Publication Data
US 2014/0376913 A1 Dec. 25, 2014

(30) Foreign Application Priority Data

Jan. 5, 2012 (JP) ................................. 2012-000621

(51) Int. Cl.
*H04J 14/02* (2006.01)
*H04Q 11/00* (2006.01)
*G02B 6/28* (2006.01)

(52) U.S. Cl.
CPC .......... *H04Q 11/0005* (2013.01); *G02B 6/2804* (2013.01); *H04J 14/02* (2013.01); *H04Q 11/0067* (2013.01); *H04Q 2011/0015* (2013.01)

(58) Field of Classification Search
USPC .............................. 398/49, 66, 45, 50, 70, 99
See application file for complete search history.

(56) References Cited

U.S. PATENT DOCUMENTS

| 7,409,154 B2* | 8/2008 | Wellen ............... H04Q 11/0067 398/12 |
| 7,860,359 B2* | 12/2010 | Cherchi ............ G02B 6/12007 385/15 |
| 8,249,454 B2* | 8/2012 | Sugawara ........... H04B 10/272 398/17 |

(Continued)

FOREIGN PATENT DOCUMENTS

| JP | 02-277030 A | 11/1990 |
| JP | H03-63607 A | 3/1991 |

(Continued)

OTHER PUBLICATIONS

International Preliminary Report on Patentability and Written Opinion in PCT International Application No. PCT/JP2012/083517, dated Jul. 17, 2014.

(Continued)

*Primary Examiner* — David Payne
*Assistant Examiner* — Omar S Ismail
(74) *Attorney, Agent, or Firm* — Venable LLP; Michael A. Sartori; Trent B. Ostler

(57) ABSTRACT

An optical branching/synthesizing device 20A includes an optical branching coupler group 25A and an optical combiner 26. The optical branching coupler group 25A includes a first-stage optical branching coupler 22 that receives a downstream optical signal Sd from an OLT device 12 at light input/output end 22a, and second-stage optical branching couplers 23 and 24 including light input/output ends 23b and 24a connected to light input/output ends 22c and 22d of the optical branching coupler 22 at the previous stage, respectively. A light input/output ends 23a, 23b, 24a, 24b of the optical branching couplers 23 and 24 transmit the downstream optical signal Sd to each ONU device 13 and receive upstream optical signals Su from the ONU devices 13. The optical combiner combines the upstream optical signals Su output from the light input/output ends 22b, 23a, and 24b of the optical branching couplers 22 to 24.

16 Claims, 5 Drawing Sheets

(56) References Cited

U.S. PATENT DOCUMENTS

| | | | |
|---|---|---|---|
| 2003/0095314 A1* | 5/2003 | Shimada | H04B 10/272 398/141 |
| 2003/0193712 A1* | 10/2003 | Kinoshita | H04B 10/294 259/333 |
| 2009/0304388 A1* | 12/2009 | Umematsu | H04J 14/0282 398/72 |
| 2014/0003777 A1* | 1/2014 | Sengupta | B44C 1/22 385/124 |

FOREIGN PATENT DOCUMENTS

| | | |
|---|---|---|
| JP | 05-322696 A | 12/1993 |
| JP | 08-242207 A | 9/1996 |
| JP | 2008-054244 A | 3/2008 |
| JP | 2008-276001 A | 11/2008 |
| JP | 2014-502798 A | 2/2014 |
| WO | WO-2012/082375 A1 | 6/2012 |

OTHER PUBLICATIONS

International Search Report in PCT International Application No. PCT/JP2012/083517, dated Jan. 29, 2013.

Notice of Reasons for Rejection in Japanese Patent Application No. P2012-000621, dated Jul. 14, 2015.

* cited by examiner

OPTICAL BRANCHING/SYNTHESIZING DEVICE

TECHNICAL FIELD

The present invention relates to an optical branching/synthesizing device for use in an optical distribution network.

BACKGROUND ART

Patent Document 1 describes an optical branching module for use in the fields such as optical communication. FIG. 5 is a diagram showing a configuration of this optical branching module. This optical branching module 100 includes an optical branching circuit 103, two reflective plates 104a and 104b, and a plurality of optical fibers 105. The optical branching circuit 103 has a configuration in which a plurality of optical branching elements 102, 106, 107a, and 107b are connected in multiple stages through an optical waveguide 101 on a substrate. The reflective plate 104a reflects one light beam branched in the optical branching element 106 back to the optical branching element 107a. The reflective plate 104b reflects the other light beam branched in the optical branching element 106 back to the optical branching element 107b.

CITATION LIST

Patent Literature

Patent Document 1: Japanese Patent Application Laid-Open Publication No. 2008-276001

SUMMARY OF INVENTION

Technical Problem

In an optical distribution network in which optical communication is performed between an optical line terminal (hereinafter referred to as an OLT device) on the base station side and a plurality of optical network units (hereinafter referred to as ONU devices) on the subscriber side, an optical branching device, such as the optical branching module 100 shown in FIG. 5, is used in order to branch a downstream optical signal from the OLT device to the ONU devices. The optical branching device in general branches an optical signal into a desired number of optical signals through a plurality of stages in such a manner as to branch a downstream optical signal from the OLT device into two and further branch each of the downstream optical signals into two.

By contrast, upstream optical signals are output from the ONU devices to the OLT device. These upstream optical signals flow back through the optical splitters such as the optical branching elements 102, 106, 107a, and 107b shown in FIG. 5 and therefore suffer a large loss every time passing through them. For example, when an upstream optical signal is input from the output side of a one-input two-output optical splitter, the intensity of the upstream optical signal taken out from the input side of the optical splitter is about ½ of the input upstream optical signal. In the optical branching module 100 shown in FIG. 5, for example, every time an upstream optical signal passes through each of the optical branching elements 102, 107a (or 107b) and 106, its intensity becomes ½, and the intensity of the upstream optical signal eventually attenuates down to ⅛ of that of the input upstream optical signal. In general, in a one-input n-output (n is an integer equal to or greater than two) optical branching device, the intensity of the upstream optical signal attenuates to about 1/n of that of the input upstream optical signal.

In recent years, with the increasing number of subscribers to the optical distribution network, there arises a need to increase the number n of branches in an optical branching device. Increasing the number n of branches, however, attenuates the intensity of an upstream optical signal more significantly as described above and may make reception at the OLT device difficult. In the one-input n-output optical branching device, a downstream optical signal also attenuates to about 1/n when reaching each ONU device. Such attenuation of a downstream optical signal, however, can be solved by increasing the intensity of a downstream optical signal at the base station even when the number n of branches increases. By contrast, increasing the intensity of an upstream optical signal at each ONU device in order to solve attenuation of the upstream optical signal is undesirable because it imposes a burden on the existing subscribers.

The present invention is made in view of such a problem and aims to provide an optical branching/synthesizing device capable of maintaining a sufficient intensity of the upstream optical signal received at the OLT device.

Solution to Problem

An optical branching/synthesizing device according to the present invention is for use in an optical distribution network in which optical communication is performed between an OLT device on a base station side and a plurality of ONU devices on a subscriber side. This optical branching/synthesizing device includes a first-stage optical branching coupler, a final-stage optical branching coupler, and an optical combiner. The first-stage optical branching coupler is an optical branching coupler including a pair of first light input/output ends and a pair of second light input/output ends, branching light input from one of the pair of first light input/output ends to the pair of second light input/output ends, and branching light input from one of the pair of second light input/output ends to the pair of first light input/output ends. The first-stage optical branching coupler receives a downstream optical signal having a first wavelength at one of the pair of first light input/output ends from the OLT device. The final-stage optical branching coupler is an optical branching coupler including a pair of third light input/output ends and a pair of fourth light input/output ends, branching light input from one of the pair of third light input/output ends to the pair of fourth light input/output ends, and branching light input from one of the pair of fourth light input/output ends to the pair of third light input/output ends. In the final-stage optical branching coupler, one of the pair of third light input/output ends is optically coupled to one of the pair of second light input/output ends of the first-stage optical branching coupler, and the pair of fourth light input/output ends transmits the downstream signal to each ONU device and receives an upstream optical signal having a second wavelength from each ONU device. The optical combiner combines the upstream optical signals output from the other of the pair of first light input/output ends of the first-stage optical branching coupler and from the other of the pair of third light input/output ends of the final-stage optical branching coupler.

The optical branching/synthesizing device may further include an intermediate-stage optical branching coupler that is arranged between the first-stage optical branching coupler and the final-stage optical branching coupler. The intermediate-stage optical branching coupler includes a pair of sixth light input/output ends and a pair of seventh light input/output ends, branches light input from one of the pair of sixth light input/output ends to the pair of seventh light input/output ends, and branches light input from one of the pair of seventh light input/output ends to the pair of sixth light input/output ends. In the intermediate-stage optical branching coupler, one of the pair of sixth light input/output ends is optically coupled to one of the second light input/output ends of the first-stage optical branching coupler, and one of the pair of seventh light input/output ends is optically coupled to one of the pair of third light input/output ends of the final-stage optical branching coupler. In this case, the optical combiner further combines the upstream optical signal output from the other of the pair of sixth light input/output ends of the intermediate-stage optical branching coupler.

In the optical branching/synthesizing device described above, when a downstream optical signal is output from the OLT device, this downstream optical signal is input to an optical branching coupler group at least including the first-stage and final-stage optical branching couplers. In this optical branching coupler group, the downstream optical signal is first input to one of the pair of first light input/output ends of the first-stage optical branching coupler. The downstream optical signal is then branched into two optical signals in the first-stage optical branching coupler, and these optical signals are output from the pair of second light input/output ends of the first-stage optical branching coupler. The two downstream optical signals output from the first-stage optical branching coupler are input to one of the pair of third light input/output ends of each of the final-stage optical branching couplers (in a case where the final stage is the second stage, the number of second-stage optical branching couplers is usually two). For example, in the case where the final stage is the second stage, the two downstream optical signals are further branched in a total of four optical signals by the optical branching couplers, and these four optical signals are output from the fourth light input/output ends of the final-stage optical branching couplers. In a case where the final stage is equal to or greater than the N-th stage (N is an integer equal to or greater than three), the downstream optical signal is branched every time being input to the second to N-th stage optical branching couplers and sent to the ONU devices (the number of the ONU devices is $2^N$ at most) on the subscriber side after being output from the N-th stage optical branching coupler at the final stage.

By contrast, when an upstream optical signal is output from an ONU device, the upstream optical signal is first input to the fourth light input/output end of the N-th stage optical branching coupler at the final stage. The upstream optical signal is then branched into two optical signals in the N-th stage optical branching coupler, and the optical signals are output from the pair of third light input/output ends of the N-th stage optical branching coupler. Among them, the upstream optical signal output from one of the third light input/output ends is input to the seventh light input/output end of the (N−1)th stage optical branching coupler at the intermediate stage, and further branched and output from the pair of sixth light input/output ends of the (N−1)-th stage optical branching coupler. The branching of the upstream optical signal is thus repeated in the optical branching couplers from the final stage to the first stage. This is applicable to the case where the final stage is the second-stage optical branching coupler.

The upstream optical signal branched in the optical branching couplers from the final stage to the first stage and output from the other of the light input/output ends on the OLT side is collected in the optical combiner. The upstream optical signal collected in the optical combiner can be, for example, detected as it is by a photodetector or transmitted to a photodetector through a multi-mode optical fiber or a multi core optical fiber.

In the above-described optical branching/synthesizing device, as described above, the upstream optical signal branched over and over again when flowing back through the optical branching couplers from the final stage to the first stage is eventually collected in the optical combiner. This optical branching/synthesizing device therefore can reduce a loss (attenuation) of the upstream optical signal in a plurality of optical branching couplers and maintain a sufficient intensity of the upstream optical signal received at the OLT device.

The optical branching/synthesizing device may further include a first wavelength division coupler including a first light input end receiving the downstream optical signal from the OLT device, a fifth light input/output end optically coupled to one of the first light input/output ends of the first-stage optical branching coupler for outputting the downstream optical signal and receiving the upstream optical signal, and a first light output end outputting the upstream optical signal input from the fifth light input/output end. In this case, the optical combiner further combines the upstream optical signal output from the first light output end of the first wavelength division coupler.

In this optical branching/synthesizing device, when a downstream optical signal is output from the OLT device, the downstream optical signal is first input to the first light input end of the first wavelength division coupler, passed through the first wavelength division coupler, and output from the fifth light input/output end to the first-stage optical branching coupler. By contrast, an upstream optical signal output from one of the first light input/output ends of the first-stage optical branching coupler is input to the fifth light input/output end of the first wavelength division coupler and output from the first light output end. This upstream signal is collected in the optical combiner together with the upstream optical signals branched in the optical branching couplers from the final stage to the first stage and output from the other of the light input/output ends on the OLT side.

With the optical branching/synthesizing device, the upstream optical signal output from one of the first light input/output ends of the first-stage optical branching coupler is branched in the first wavelength division coupler and sent to the optical combiner. A loss (attenuation) of the upstream optical signal therefore can be further reduced. The optical branching/synthesizing device may further include a second wavelength division coupler including second and third light input ends receiving downstream optical signals having wavelengths different from each other from the OLT device, and a second light output end outputting a downstream signal produced by combining the downstream signals having different wavelengths.

In the optical branching/synthesizing device, the first wavelength may be a wavelength included in a range of not less than 1.48 μm to not more than 1.58 μm, and the second wavelength may be a wavelength included in a range of not less than 1.26 μm to not more than 1.36 μm.

Advantageous Effects of Invention

The optical branching/synthesizing device according to the present invention can maintain a sufficient intensity of the upstream optical signal received at the OLT device.

DESCRIPTION OF EMBODIMENTS

Embodiments of an optical branching/synthesizing device according to the present invention will be described in details below with reference to the accompanying drawings. In the description of the drawings, the same elements are denoted with the same reference signs and an overlapping description will be omitted.

First Embodiment

Figure 1:
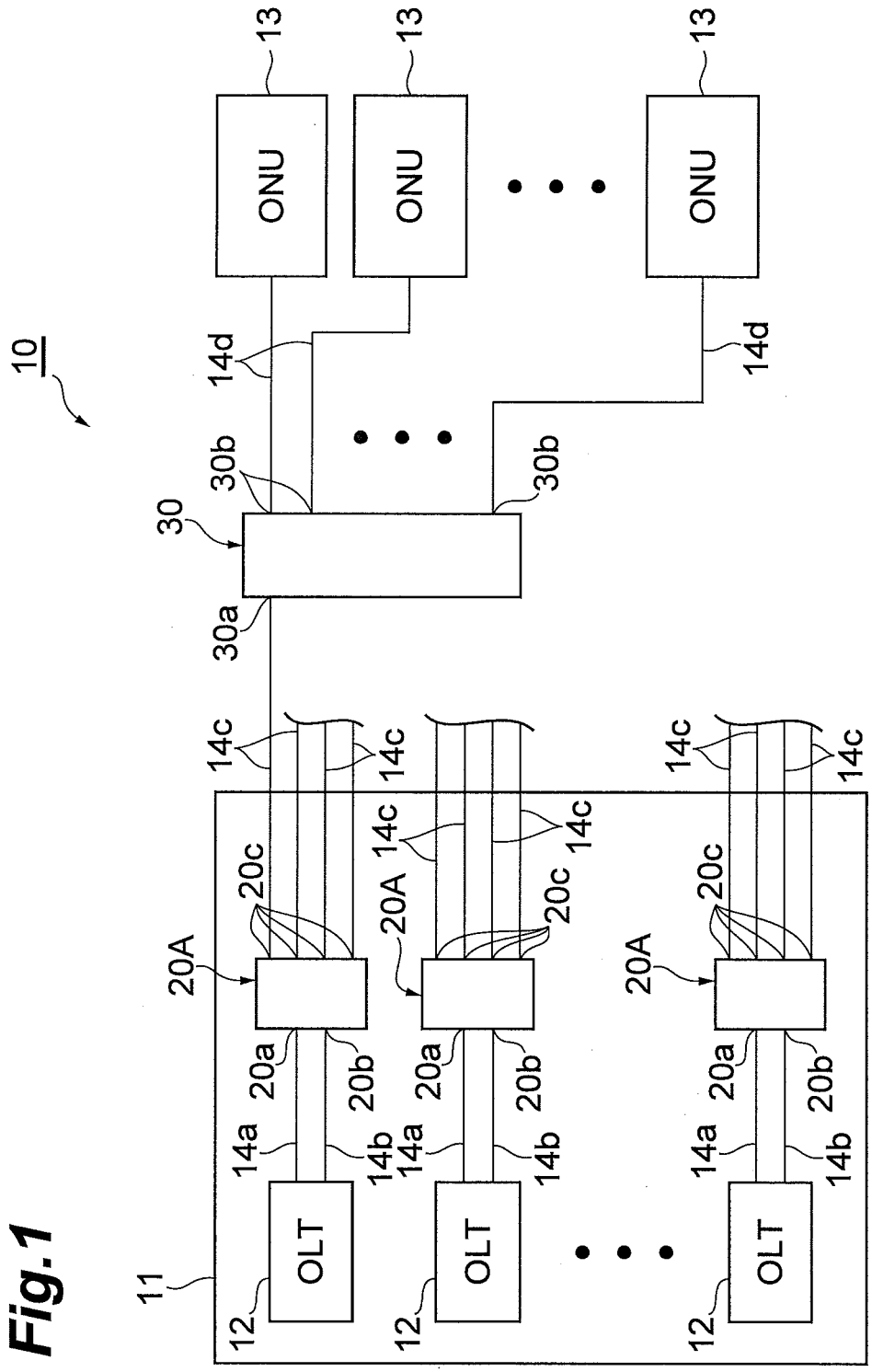
FIG. 1 is a diagram showing an exemplary configuration of an optical distribution network including an optical branching/synthesizing device according to a first embodiment of the present invention.

FIG. 1 is a diagram showing an exemplary configuration of an optical distribution network (Passive Optical Network; PON) including an optical branching/synthesizing device according to a first embodiment of the present invention. In this optical distribution network 10, optical communication is performed between an OLT device 12 of a base station 11 and a plurality of ONU devices 13 on the subscriber side (optical line terminator on the subscriber side). The OLT device 12 is an optical line terminator on the base station 11 side, and the ONU devices 13 are optical line terminators on the subscriber side. The wavelength (first wavelength) of a downstream optical signal sent from the OLT device 12 to the ONU devices 13 is, for example, a wavelength included in a range of not less than 1.48 µm to not more than 1.58 µm, and examples of the typical wavelength band include the 1.49 µm band, the 1.5 µm band, the 1.55 µm band, and the 1.57 µm band. The wavelength (second wavelength) of an upstream optical signal sent from each of the ONU devices 13 to the OLT device 12 is, for example, a wavelength included in a range of not less than 1.26 µm to not more than 1.36 µm, and an example of the typical wavelength band is the 1.3 µm band.

A plurality of OLT devices 12 are installed in the base station 11, and each OLT device 12 is connected with the ONU devices 13. Specifically, the OLT device 12 is connected to a light input end 20a and a light output end 20b of an optical branching/synthesizing device 20A through optical fibers 14a and 14b, respectively. The optical branching/synthesizing device 20A includes a plurality of light input/output ends 20c, branches a downstream optical signal input to the light input end 20a to output the branched downstream optical signals from the light input/output ends 20c, and combine upstream optical signals input to the light input/output ends 20c to output the combined upstream optical signal from the light output end 20b. In the present embodiment, the number of light input/output ends 20c is, for example, four.

Each light input/output end 20c of the optical branching/synthesizing device 20A is connected to a light input/output end 30a of an optical splitter 30 through an optical fiber 14c. The optical splitter 30 includes a plurality of light input/output ends 30b, branches a downstream optical signal input to the light input/output end 30a to output the branched downstream optical signals from the light input/output ends 30b, and combines upstream optical signals input to the light input/output ends 30b to output the combined upstream optical signal from the light input/output end 30a. The light input/output ends 30b are connected to the ONU devices 13 through optical fibers 14d one by one. The number of branches in the optical splitter 30 (the number of light input/output ends 30b) is, for example, 16, 32, or 64.

Figure 2:
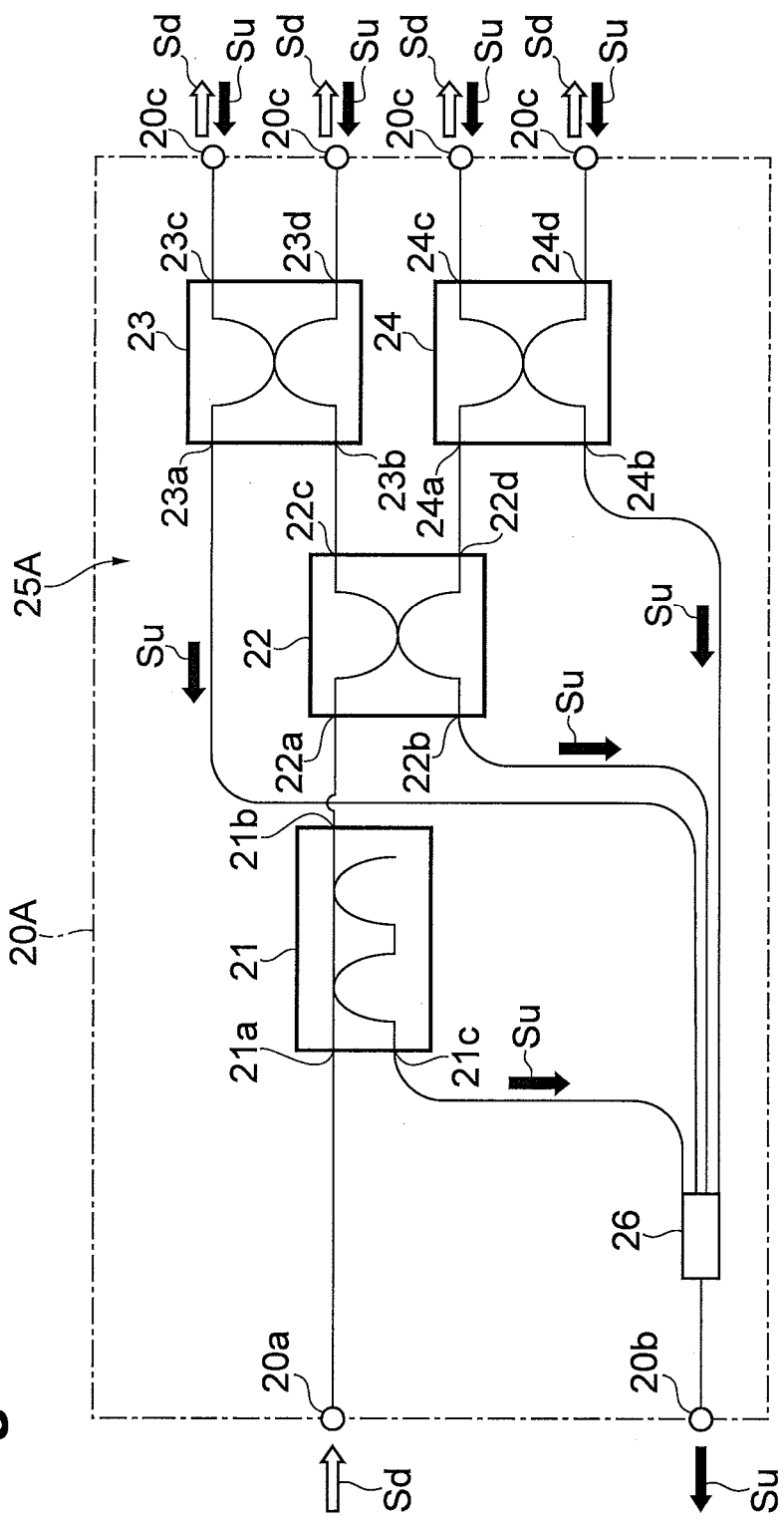
FIG. 2 is a diagram showing a configuration of the optical branching/synthesizing device.

FIG. 2 is a diagram showing a configuration of the optical branching/synthesizing device 20A. As shown in FIG. 2, the optical branching/synthesizing device 20A in the present embodiment includes a WDM coupler 21, an optical branching coupler group 25A including a plurality of (in the present embodiment, three) optical branching couplers 22 to 24, and an optical combiner 26. The optical branching/synthesizing device 20A includes the light input end 20a, the light output end 20b, and the light input/output ends 20c (in the present embodiment, the number of the light input/output ends 20c is four) as described above. The light input end 20a receives a downstream optical signal Sd from the OLT device 12, and the light output end 20b outputs an upstream optical signal Su to the OLT device 12. The plurality of light input/output ends 20c output downstream optical signals Sd and receive upstream optical signals Su.

The WDM coupler 21 is a first wavelength division coupler in the present embodiment and includes a light input end 21a, a light input/output end 21b, and a light output end 21c. The light input end 21a is optically coupled with the light input end 20a and receives a downstream optical signal Sd (for example, in the 1.55 µm band) from the OLT device 12 through the light input end 20a. The WDM coupler 21 outputs this downstream optical signal Sd from the light input/output end 21b. The light input/output end 21b is optically coupled with the optical branching coupler 22 described later, and this downstream optical signal Sd is output to the optical branching coupler 22. The light input/output end 21b also receives an upstream optical signal Su (in the 1.3 µm band) from the optical branching coupler 22. The WDM coupler 21 outputs the upstream optical signal Su having a wavelength different from that of the downstream optical signal Sd from the light output end 21c while preventing this upstream optical signal Su from reaching the light input end 21a.

The optical branching couplers 22 to 24 each have a configuration of an X optical branching coupler. That is, the optical branching coupler 22 includes a pair of light input/output ends 22a, 22b and another pair of light input/output ends 22c, 22d. The optical branching coupler 22 branches light output from one of the light input/output ends 22a, 22b to the light input/output ends 22c, 22d and branches light input from one of the light input/output ends 22c, 22d to the light input/output ends 22a, 22b. Similarly, the optical branching coupler 23 includes a pair of light input/output ends 23a, 23b and another pair of light input/output ends 23c, 23d. The optical branching coupler 23 branches light input from one of the light input/output ends 23a, 23b to the light input/output ends 23c, 23d and branches light input from one of the light input/output ends 23c, 23d to the light input/output ends 23a, 23b. The optical branching coupler 24 also includes a pair of light input/output ends 24a, 24b and another pair of light input/output ends 24c, 24d. The optical branching coupler 24 branches light input from one of the light input/output ends 24a, 24b to the light input/output ends 24c, 24d and branches light input from one of the light input/output ends 24c, 24d to the light input/output ends 24a, 24b.

The optical branching coupler 22 is a first-stage optical branching coupler in the present embodiment. One of the light input/output ends 22a, 22b of the optical branching coupler 22 (in the present embodiment, the light input/output end 22a) is optically coupled to the light input/output end 21b of the WDM coupler 21. The optical branching couplers 23 and 24 are second-stage optical branching couplers in the present embodiment. In the present embodiment, the second stage is the final stage because the number of the optical branching couplers in the optical branching coupler group 25A is three. One of the light input/output ends 23a, 23b of the optical branching coupler 23 (in the present embodiment, the light input/output end 23b) is optically coupled to the light input/output end 22c of the optical branching coupler 22 at the previous stage. One of the light input/output ends 24a, 24b of the optical branching coupler 24 (in the present embodiment, the light input/output end 24a) is optically coupled to the light input/output end 22d of the optical branching coupler 22 at the previous stage. The light input/output ends 23c and 23d of the optical branching coupler 23 and the light input/output ends 24c and 24d of the optical branching coupler 24 are optically coupled to the four light input/output ends 20c of the optical branching/synthesizing device 20A.

The optical combiner 26 is optically coupled to the other of the light input/output ends 22a, 22b of the optical branching coupler 22 (in the present embodiment, the light input/output end 22b), the other of the light input/output ends 23a, 23b of the optical branching coupler 23 (in the present embodiment, the light input/output end 23a), the other of the light input/output ends 24a, 24b of the optical branching coupler 24 (in the present embodiment, the light input/output end 24b), and the light output end 21c of the WDM coupler 21 to combine light output from these light input/output ends 22b, 23a, 24b, and light output end 21c. The optical combiner 26 is preferably configured with, for example, a multi-mode optical fiber or a multi core optical fiber. The optical combiner 26 is optically coupled to the light output end 20b, so that the combined light is output to the OLT device 12 (see FIG. 1) through the light output end 20b. The optical combiner 26 may be configured with a photodetector element such as a photodiode. In this case, the intensity of the combined light is converted into an electrical signal by the photodetector element, and this electrical signal is sent to the OLT device 12.

The operation of the optical branching/synthesizing device 20A having the above-described configuration will be described for each case of the downstream optical signal Sd and the upstream optical signal Su.

<Operation for Downstream Signal>

When a downstream optical signal Sd is output from the OLT device 12, first, this downstream optical signal Sd is input to the light input end 21a of the WDM coupler 21, passed through the WDM coupler 21, and output from the light input/output end 21b. The downstream optical signal Sd is thereafter input to the optical branching coupler group 25A. In this optical branching coupler group 25A, the downstream optical signal Sd is first input to the light input/output end 22a of the optical branching coupler 22. The downstream optical signal Sd is then branched into two in the optical branching coupler 22, and these downstream optical signals Sd are output from the light input/output ends 22c, 22d of the optical branching coupler 22.

The downstream optical signal Sd output from the light input/output end 22c of the optical branching coupler 22 is input to the light input/output end 23b of the optical branching coupler 23. This downstream optical signal Sd is then further branched into two downstream optical signals Sd in the optical branching coupler 23, and these two downstream optical signals Sd are output from the light input/output ends 23c, 23d of the optical branching coupler 23. The downstream optical signal Sd output from the light input/output end 22d of the optical branching coupler 22 is input to the light input/output end 24a of the optical branching coupler 24. This downstream optical signal Sd is then further branched into two downstream optical signals Sd in the optical branching coupler 24, and these two downstream optical signals Sd are output from the light input/output ends 24c, 24d of the optical branching coupler 24.

As described above, the downstream optical signal Sd input to the optical branching coupler group 25A is branched every time being input to the first-stage and second-stage optical branching couplers 22 to 24, and is divided into a total of four downstream optical signals Sd. The four downstream optical signals Sd are input to each ONU device 13 through four optical splitters 30 (see FIG. 1.).

<Operation for Upstream Signal>

When an upstream optical signal Su is output from an ONU device 13, this upstream optical signal Su is first input to one of the light input/output ends 23c, 23d (or one of 24c, 24d) of the second-stage optical branching coupler 23 (or 24). The upstream optical signal Su is then branched into two upstream optical signals Su in the optical branching coupler 23 (or 24), and these upstream optical signals Su are output from the light input/output ends 23a, 23b (or 24a, 24b) of the optical branching coupler 23 (or 24).

Among them, the upstream optical signal Su output from the light input/output end 23b (or 24a) is input to the light input/output end 22c (or 22d) of the optical branching coupler 22 at the previous stage and further branched into two, which in turn are output from the light input/output ends 22a, 22b of the optical branching coupler 22. The upstream optical signal Su output from the light input/output end 22a of the optical branching coupler 22 is input to the light input/output end 21b of the WDM coupler 21, passed through the WDM coupler 21, and output from the light output end 21c.

The upstream optical signals Su branched in the optical branching coupler 23 (or 24) and 22 and output from the light input/output end 23a (or 24b) and 22b are collected together with the upstream optical signal Su output from the light output end 21c of the WDM coupler 21 in the optical combiner 26. The upstream optical signals Su collected in the optical combiner 26 are sent to the OLT device 12 through the light output end 20b.

Figure 5:
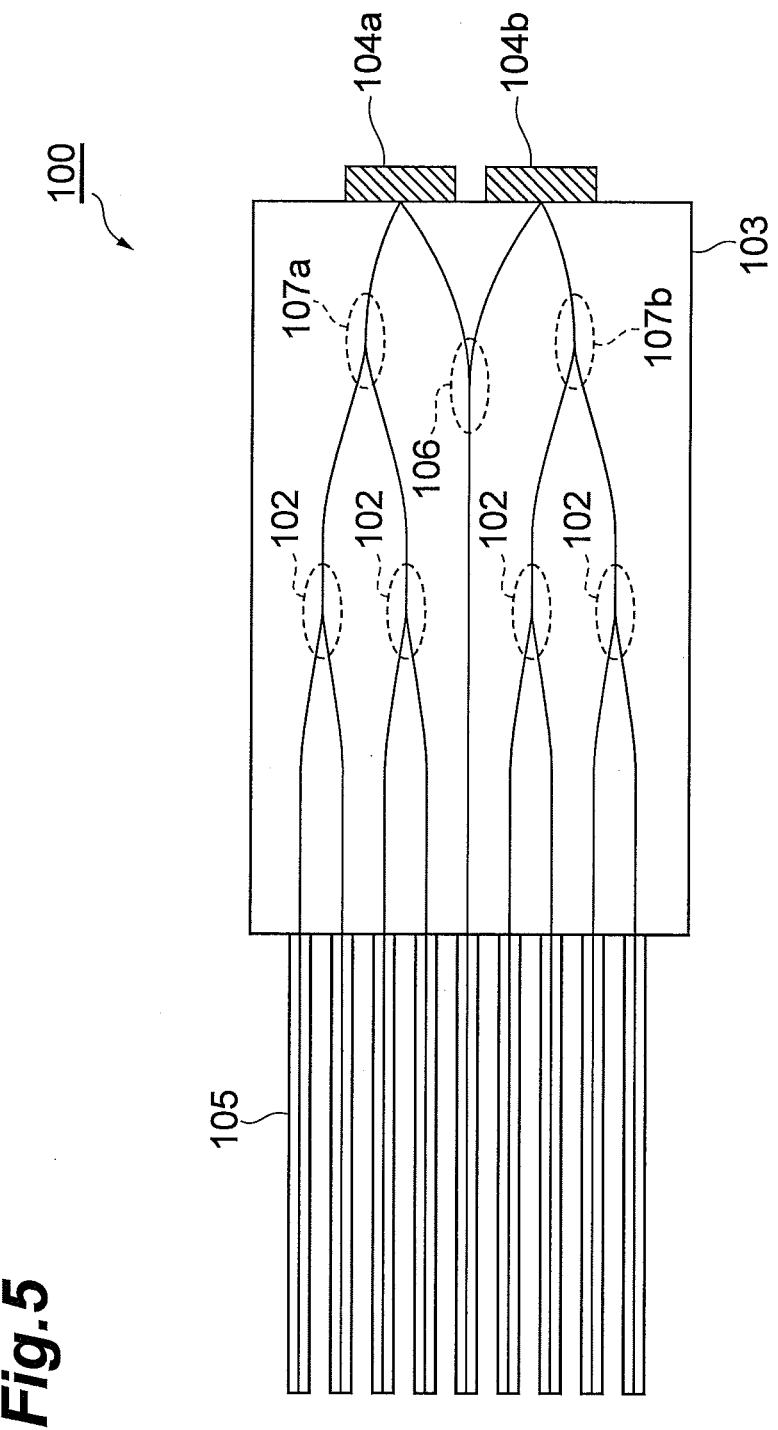
FIG. 5 is a diagram showing a configuration of an optical branching module described in Patent Document 1.

The above-described advantageous effects achieved by the optical branching/synthesizing device 20A will be described. As described above, the upstream optical signal Su from each of the ONU devices 13 is first branched into two in the second-stage optical branching coupler 23 (or 24). Here, the intensity of the branched upstream optical signal Su is about ½ (−3 dB) of that before the branching One of these upstream optical signals Su is then further branched into two in the first-stage optical branching coupler 22, so that the intensity of the branched upstream optical signal Su is about ¼. However, in the optical branching/synthesizing device 20A, the upstream optical signal Su (at an intensity of about ½) output from the light input/output end 23a (or 24b) of the second-stage optical branching coupler 23 (or 24) and the upstream optical signal Su (at an intensity of about ¼) output from the light input/output end 22b of the first-stage optical branching coupler 22 are collected in the optical combiner 26 and sent to the OLT device 12. The intensity of the upstream optical signal Su sent to the OLT device 12 is therefore about ¾ of the intensity before input to the optical branching/synthesizing device 20A. By contrast, for example, in the conventional device shown in FIG. 5, in a case where the number of branches is four, the intensity of the upstream optical signal is about ¼ of that before branching. As described above, the optical branching/synthesizing device 20A in the present embodiment can reduce a loss (attenuation) of the upstream optical signal Su in the optical branching couplers 22 to 24 and maintain a sufficient intensity of the upstream optical signal Su received at the OLT device 12.

The actual intensity of the upstream optical signal Su obtained in the optical combiner 26 is further reduced when considering losses such as a loss in the inside of the optical branching couplers 22 to 24 and a coupling loss produced between the optical branching coupler 22 and the optical branching couplers 23 and 24. The advantageous effects achieved by the optical branching/synthesizing device 20A in the present embodiment as described above nevertheless remain the same relative to the conventional device. Although in the foregoing description, the upstream optical signal Su is branched evenly in each of the optical branching couplers 22 to 24 for the ease of understanding, the upstream optical signal Su is not always branched evenly in a case where the optical branching characteristics of the optical branching couplers 22 to 24 are defined with respect to the wavelength band of the downstream optical signal Sd. However, even in such a case, the optical branching/synthesizing device 20A in the present embodiment can maintain a sufficient intensity of the upstream optical signal Su because the branched upstream optical signals Su are collected in the optical combiner 26 for output.

It is preferable that the WDM coupler 21 be provided between the optical branching coupler group 25A and the OLT device 12 as in the optical branching/synthesizing device 20A in the present embodiment. The upstream optical signal Su (at an intensity of about ¼) output from the light input/output end 22a of the optical branching coupler 22 is branched and sent to the optical combiner 26 by the WDM coupler 21, whereby each upstream optical signal Su branched over and over again when flowing back through the optical branching couplers 22 to 24 is eventually collected in the optical combiner 26. Accordingly, the intensity of the upstream optical signal Su sent to the OLT device 12 can be further brought closer to the intensity before input to the optical branching/synthesizing device 20A. A loss (attenuation) of the upstream optical signal Su therefore can be further reduced.

Second Embodiment

Figure 3:
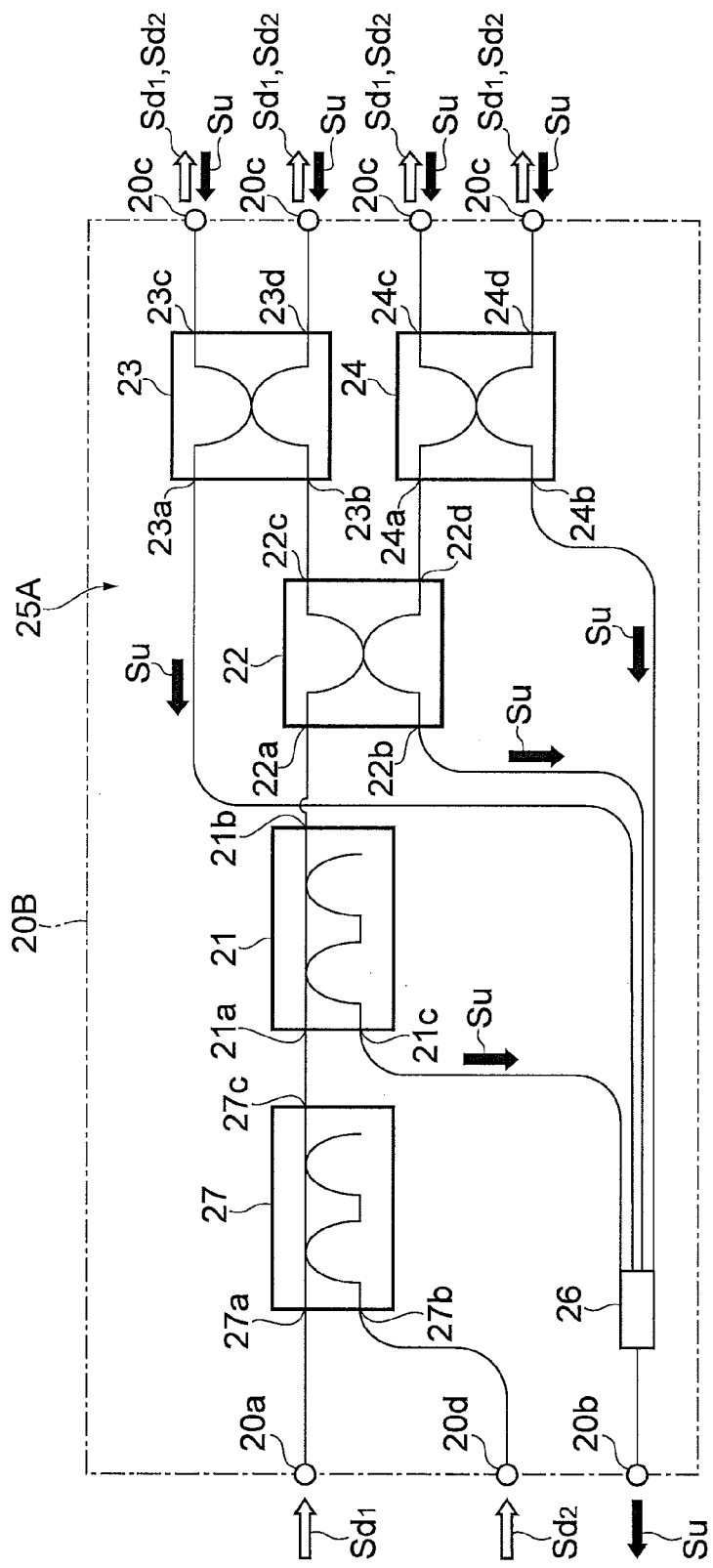
FIG. 3 is a diagram showing a configuration of a second embodiment of the optical branching/synthesizing device according to the present invention.

FIG. 3 is a diagram showing a configuration of an optical branching/synthesizing device 20B as a second embodiment of the optical branching/synthesizing device according to the present invention. The optical branching/synthesizing device 20B in the present embodiment differs from the optical branching/synthesizing device 20A in the first embodiment in the number of downstream optical signals and the number of WDM couplers. More specifically, the optical branching/synthesizing device 20B in the present embodiment further includes a WDM coupler 27 in addition to the WDM coupler 21. The optical branching/synthesizing device 20B in the present embodiment further includes a light input end 20d in addition to the light input end 20a.

The light input ends 20a and 20d are coupled to the OLT device 12. The light input end 20a receives a downstream optical signal $Sd_1$ from the OLT device 12, and the light input end 20d receives a downstream optical signal $Sd_2$ from the OLT device 12. The downstream optical signals $Sd_1$ and $Sd_2$ have wavelengths different from each other. Examples of the wavelength band of the downstream optical signal $Sd_1$ are the 1.49 μm band and the 1.57 μm band, and an example of the wavelength band of the downstream optical signal $Sd_2$ is the 1.55 μm band. The downstream optical signal in the 1.55 μm band is typically an analog optical signal, and those in the 1.57 μm band and the 1.49 μm band are digital optical signals (the Internet optical signal).

The WDM coupler 27 includes light input ends 27a and 27b and a light output end 27c. The light input end 27a is optically coupled to the light input end 20a and receives the downstream optical signal $Sd_1$ from the OLT device 12 through the light input end 20a. The light input end 27b is optically coupled to the light input end 20d and receives the downstream optical signal $Sd_2$ from the OLT device 12 through the light input end 20d. The WDM coupler 27 combines these downstream optical signals $Sd_1$ and $Sd_2$ for output to the light output end 27c. The light output end 27c is optically coupled to the light input end 21a of the WDM coupler 21, and these downstream optical signals $Sd_1$ and $Sd_2$ are output to the WDM coupler 21. The downstream optical signals $Sd_1$ and $Sd_2$ follow the same path as the downstream optical signal Sd in the first embodiment and are output from the four light input/output ends 20c.

Even when the downstream optical signals of a plurality of wavelength bands (the 1.49 μm band, the 1.55 μm band, and the 1.57 μm band) are input to the optical branching coupler group 25A as in the present embodiment, those wavelength bands and the wavelength band (the 1.3 μm band) of the upstream optical signal Su are different from each other, and, therefore, the upstream optical signals Su are suitably collected in the optical combiner 26. The same advantageous effects as in the optical branching/synthesizing device 20A in the first embodiment therefore can be achieved.

Third Embodiment

Figure 4:
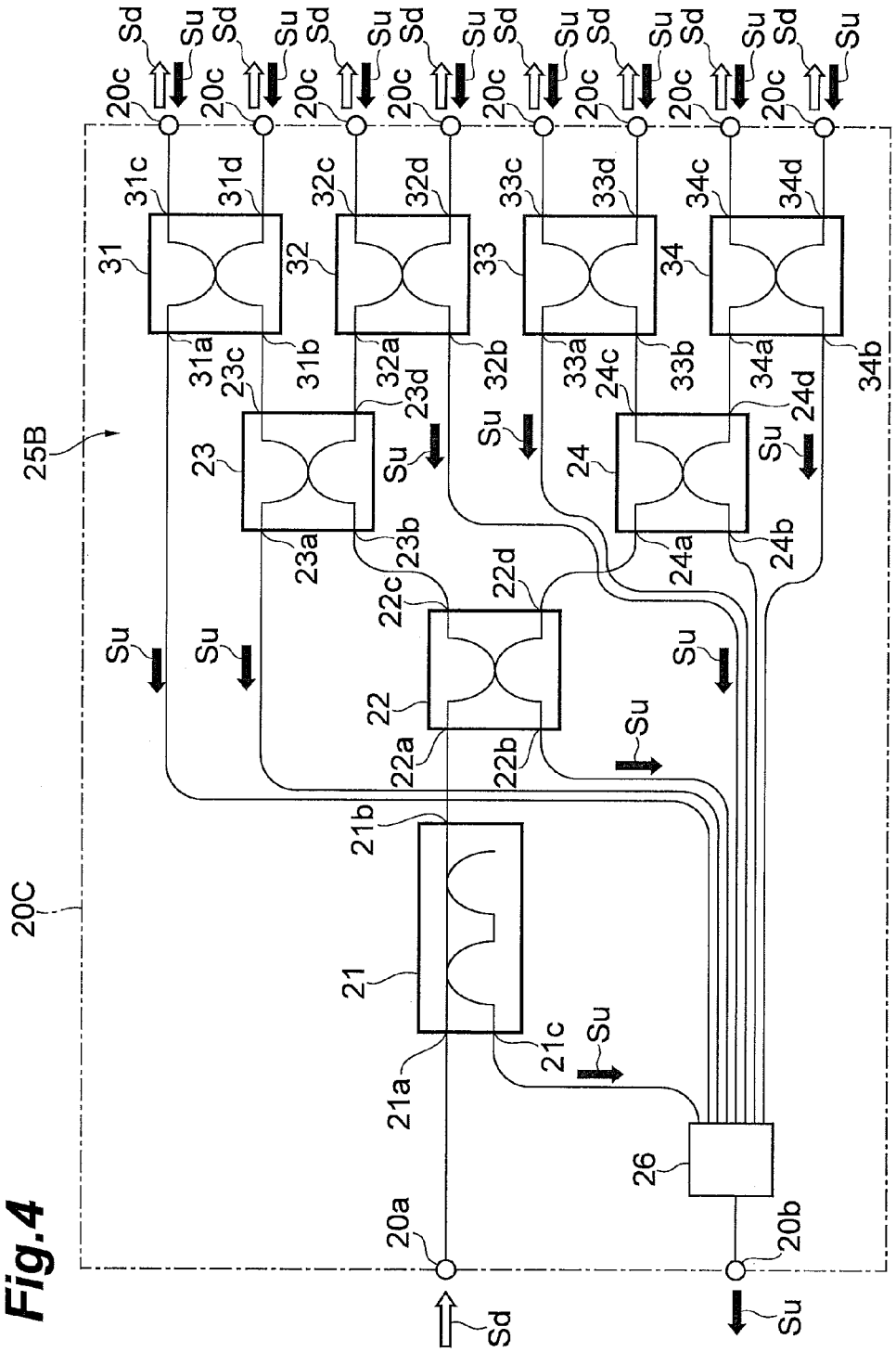
FIG. 4 is a diagram showing a configuration of a third embodiment of the optical branching/synthesizing device according to the present invention.

FIG. 4 is a diagram showing a configuration of an optical branching/synthesizing device 20C as a third embodiment of the optical branching/synthesizing device according to the present invention. The optical branching/synthesizing device 20C in the present embodiment differs from the optical branching/synthesizing device 20A in the first embodiment in the number of optical branching couplers included in the optical branching coupler group. More specifically, the optical branching coupler group 25B of the optical branching/synthesizing device 20C in the present embodiment further includes four optical branching couplers 31 to 34 in addition to three optical branching couplers 22 to 24 in the first embodiment.

The optical branching couplers 31 to 34 are third-stage optical branching couplers in the present embodiment. In the present embodiment, this third stage is the final stage, and the optical branching couplers 23, 24 are intermediate-stage optical branching couplers. The light input/output ends 31b, 32a, 33b, and 34a of the optical branching couplers 31 to 34 are optically coupled to the light input/output ends 23c, 23d and 24c, 24d, respectively, of the optical branching couplers 23 and 24 at the previous stage. The light input/output ends 31c, 31d, 32c, 32d, 33c, 33d, 34c, and 34d of the optical branching couplers 31 to 34 are optically coupled to the eight light input/output ends 20c of the optical branching/synthesizing device 20C.

The downstream optical signal Sd input to the optical branching coupler group 25B is branched every time being input to the first to third-stage optical branching couplers 22 to 24 and 31 to 34, and divided into a total of eight downstream optical signals Sd. The eight downstream optical signals Sd are sent to each ONU device 13 through eight optical splitters 30 (see FIG. 1).

The optical combiner 26 in the present embodiment is optically coupled with the light input/output ends 31a, 32b, 33a, and 34b of the optical branching couplers 31 to 34, in addition to the light input/output ends 22b, 23a, and 24b of the optical branching couplers 22 to 24 and the light output end 21c of the WDM coupler 21, to combine the upstream optical signals Su output from those light input/output ends. The combined upstream optical signals Su are output to the OLT device 12 (see FIG. 1) through the light output end 20b.

The optical branching couplers included in the optical branching coupler group may be configured in three or more stages as in the present embodiment. More specifically, the optical branching coupler group may include the first-stage optical branching coupler (the optical branching coupler 22 in the present embodiment) receiving a downstream optical signal at one of the light input/output ends from the OLT device 12, and the second to N-th stage (where N is an integer equal to or greater than two. In the present embodiment, N=3) optical branching couplers each including the first light input/output ends one of which is coupled to the light input/output end of the optical branching coupler at the previous stage. Because of inclusion of the optical branching coupler group having such a configuration, the optical branching/synthesizing device can reduce a loss (attenuation) of the upstream optical signal Su in a plurality of optical branching couplers and maintain a sufficient intensity of the upstream optical signal Su received at the OLT device 12, as described in the first embodiment. In the case where optical branching couplers in three or more stages are included as in the present embodiment, the WDM coupler 27 may be further included as in the second embodiment.

The present invention has been described in details above based on the embodiments. The present invention, however, is not limited to the foregoing embodiments. The present invention is susceptible to various modifications within a scope not departing from the spirit of the invention. For example, although the optical branching/synthesizing device provided in a base station has been illustrated in each of the foregoing embodiments, the optical branching/synthesizing device according to the present invention may be applied to an optical splitter (the optical splitter 30 in the first embodiment) outside of a base station.

REFERENCE SIGNS LIST

10 . . . optical distribution network, 11 . . . base station, 12 . . . OLT device, 13 . . . ONU device, 20A to 20C . . . optical branching/synthesizing device, 21, 27 . . . WDM coupler, 22 to 24, 31 to 34 . . . optical branching coupler, 25A, 25B optical branching coupler group, 26 . . . optical combiner, 30 . . . optical splitter, Sd . . . downstream optical signal, Su . . . upstream optical signal.

The invention claimed is:

1. An optical branching/synthesizing device for use in an optical distribution network in which optical communication is performed between an OLT device on a base station side and a plurality of ONU devices on a subscriber side, the optical branching/synthesizing device comprising:
  a first-stage optical branching coupler that is an optical branching coupler including a pair of first light input/output ends and a pair of second light input/output ends, branching light input from one of the pair of first light input/output ends to the pair of second light input/output ends, and branching light input from one of the pair of second light input/output ends to the pair of first light input/output ends, and receives a downstream optical signal having a first wavelength at one of the pair of first light input/output ends from the OLT device;
  a final-stage optical branching coupler that is an optical branching coupler including a pair of third light input/output ends and a pair of fourth light input/output ends, branching light input from one of the pair of third light input/output ends to the pair of fourth light input/output ends, and branching light input from one of the pair of fourth light input/output ends to the pair of third light input/output ends, in which the pair of fourth light input/output ends transmits the downstream signal to each ONU device and receives an upstream optical signal having a second wavelength from each ONU device;
  an optical combiner that combines the upstream optical signals output from the other of the pair of first light input/output ends of the first-stage optical branching coupler and from the other of the pair of third light input/output ends of the final-stage optical branching coupler; and
  an intermediate-stage optical branching coupler that is an optical branching coupler including a pair of sixth light input/output a pair of seventh light input/output ends, branching light input from one of the pair of sixth light input/output ends to the pair of seventh light input/output ends, and branching light input from one of the pair of seventh light input/output ends to the pair of sixth light input/output ends, in which one of the pair of sixth light input/output ends is optically coupled to one of the second light input/output ends of the first-stage optical branching coupler, and one of the pair of seventh light input/output ends is optically coupled to one of the pair of third light input/output ends of the final-stage optical branching coupler,
  wherein the optical combiner further combines the upstream optical signal output from the other of the pair of sixth light input/output ends of the intermediate-stage optical branching coupler.

2. The optical branching/synthesizing device according to claim 1, further comprising a first wavelength division coupler including a first light input end receiving the downstream optical signal from the OLT device, a fifth light input/output end optically coupled to one of the first light input/output ends of the first-stage optical branching coupler for outputting the downstream optical signal and receiving the upstream optical signal, and a first light output end outputting the upstream optical signal input from the fifth light input/output end, wherein
  the optical combiner further combines the upstream optical signal output from the first light output end of the first wavelength division coupler.

3. The optical branching/synthesizing device according to claim 2, further comprising a second wavelength division coupler including second and third light input ends receiving downstream optical signals having wavelengths different from each other from the OLT device, and a second light output end outputting a downstream signal produced by combining the downstream signals having different wavelengths.

4. The optical branching/synthesizing device according to claim 1, wherein the first wavelength is a wavelength included in a range of not less than 1.48 μm to not more than 1.58 μm, and the second wavelength is a wavelength included in a range of not less than 1.26 μm to not more than 1.36 μm.

5. The optical branching/synthesizing device according to claim 1, wherein the optical combiner includes a multi-mode optical fiber.

6. The optical branching/synthesizing device according to claim 1, wherein the optical combiner includes a multi core optical fiber.

7. The optical branching/synthesizing device according to claim 1, wherein the optical combiner includes a photodetector element.

8. An optical branching/synthesizing device for an optical distribution network between an OLT device and a plurality of ONU devices, the optical branching/synthesizing device comprising:
- a first-stage optical coupler including a first pair of input/output ends and a second pair of input/output ends, the first-stage optical coupler receiving downstream light from the OLT device at one end of the first pair of input/output ends and branching the downstream light so as to output the branched downstream light from both ends of the second pair of input/output ends;
- a final-stage optical coupler including a third pair of input/output ends and a fourth pair of input/output ends, the final-stage optical coupler receiving upstream light from one of the plurality of ONU devices at one end of the fourth pair of light input/output ends and branching the upstream light so as to output branched upstream light from both ends of the third pair of input/output ends, one end of the third pair of input/output ends of the final-stage optical coupler being optically coupled to one end of the second pair of input/output ends of the first-stage optical coupler; and
- an optical combiner optically coupled to, an other end of the first pair of input/output ends of the first-stage optical coupler and to an other end of the third pair of input/output ends of the final-stage optical coupler,
- wherein the first-stage optical coupler receives the branched upstream light from the final-stage optical coupler at the one end of the second pair of input/output ends and branches the branched upstream light once again so as to output further branched upstream light from both ends of the first pair of input/output ends,
- wherein the optical combiner combines the further branched upstream light output from the other end of the first pair of light input/output ends of the first-stage optical coupler and the branched upstream light from the other end of the third pair of light input/output ends of the final-stage optical coupler.

9. The optical branching/synthesizing device according to claim 8, wherein the one end of the third pair of input/output ends of the final-stage optical coupler is optically coupled to the one end of the second pair of input/output ends of the first-stage optical coupler in a direct way or through an other optical device.

10. The optical branching/synthesizing device according to claim 8, further comprising a first wavelength division coupler including a first input end receiving the downstream light from the OLT device, a fifth input/output end optically coupled to the one end of the first pair of light input/output ends of the first-stage optical coupler and receiving the further branched light from the first-stage optical coupler, and a first output end coupled to the optical combiner and outputting the further branched upstream light,
- wherein the optical combiner combines the further branched upstream light output from the first output end of the first wavelength division coupler with the further branched upstream light from the first-stage optical coupler and the branched upstream light from the final-stage optical coupler.

11. The optical branching/synthesizing device according to claim 10, further comprising a second wavelength division coupler including second and third input ends each receiving downstream light having wavelengths different from each other from the OLT device, and a second output end outputting a downstream light produced by combining the downstream light having different wavelengths.

12. The optical branching/synthesizing device according to claim 8, further comprising an intermediate-stage optical coupler arranged between the first-stage optical coupler and the final-stage optical coupler and including a sixth pair of input/output ends and a seventh pair of input/output ends, the intermediate-stage optical coupler receiving the branched upstream light from the final-stage optical coupler at the one end of the seventh pair of input/output ends and branches the branched upstream light once again so as to output further branched upstream light from both ends of the sixth pair of input/output ends, in which one end of the sixth pair of input/output ends is optically coupled to the one end of the second pair of input/output ends of the first-stage optical coupler,
- wherein the optical combiner combines the further upstream light output from an other end of the sixth pair of input/output ends of the intermediate-stage optical coupler with the further branched upstream light from the first-stage optical coupler and the branched upstream light from the final-stage optical coupler.

13. The optical branching/synthesizing device according to claim 8, wherein the downstream light has a wavelength in a range of not less than 1.48 μm to not more than 1.58 μm, and the upstream light has a wavelength in a range of not less than 1.26 μm to not more than 1.36 μm.

14. The optical branching/synthesizing device according to claim 8, wherein the optical combiner includes at least one of a multi-mode optical fiber and a multi core optical fiber.

15. The optical branching/synthesizing device according to claim 8, wherein the optical combiner includes a photodetector element.

16. An optical distribution network comprising;
- the optical branching/synthesizing device according to claim 8;
- an OLT device arranged at a base station side; and
- a plurality of ONU devices arranged at a subscriber side,
- wherein the OLT device is optically coupled to one port of the optical branching/synthesizing device and each of the plurality of ONU devices is optically coupled to each of the other ports of the optical branching/synthesizing device.

* * * * *